United States Patent [19]

Kino et al.

[11] Patent Number: 5,022,743

[45] Date of Patent: * Jun. 11, 1991

[54] SCANNING CONFOCAL OPTICAL MICROSCOPE

[75] Inventors: Gordon S. Kino; Guoging Xiao, both of Stanford, Calif.

[73] Assignee: The Board of Trustees of the Leland Stanford Junior University, Stanford, Calif.

[*] Notice: The portion of the term of this patent subsequent to May 22, 2007 has been disclaimed.

[21] Appl. No.: 509,731

[22] Filed: May 29, 1990

Related U.S. Application Data

[60] Division of Ser. No. 226,044, Jul. 29, 1988, Pat. No. 4,927,254, which is a continuation of Ser. No. 31,516, Mar. 27, 1987, abandoned.

[51] Int. Cl.[5] .............................................. G02B 21/06
[52] U.S. Cl. ..................................... 350/507; 350/527; 350/508; 350/399; 350/274; 350/276 SL
[58] Field of Search ............... 350/507, 508, 274, 273, 350/272, 527, 526, 1.2, 525, 524, 276 SL; 250/234, 225, 235, 236

[56] References Cited

U.S. PATENT DOCUMENTS

| 3,013,467 | 12/1961 | Minsky | 350/527 |
| 3,460,880 | 8/1969 | Henderson | 350/527 |
| 3,517,980 | 6/1970 | Petran et al. | 350/527 |
| 3,926,500 | 12/1975 | Frosch et al. | 350/527 |
| 4,062,623 | 12/1977 | Suzuki et al. | 350/527 |
| 4,198,571 | 4/1980 | Sheppard | 350/508 |
| 4,251,129 | 2/1987 | Suzki et al. | 350/527 |
| 4,800,269 | 1/1989 | Horikawa | 250/234 |
| 4,806,004 | 2/1989 | Wayland | 350/507 |

Primary Examiner—Jon W. Henry
Attorney, Agent, or Firm—Flehr, Hohbach, Test, Albritton & Herbert

[57] ABSTRACT

A scanning confocal optical microscope using a Nipkow disc having a plurality of pinholes to project light and an objective lens to receive the light and illuminate points on an object to be viewed. Rotation of the disc scans the points across the object. The object is viewed by viewing the reflected light focused on the pinholes by the objective lens.

1 Claim, 10 Drawing Sheets

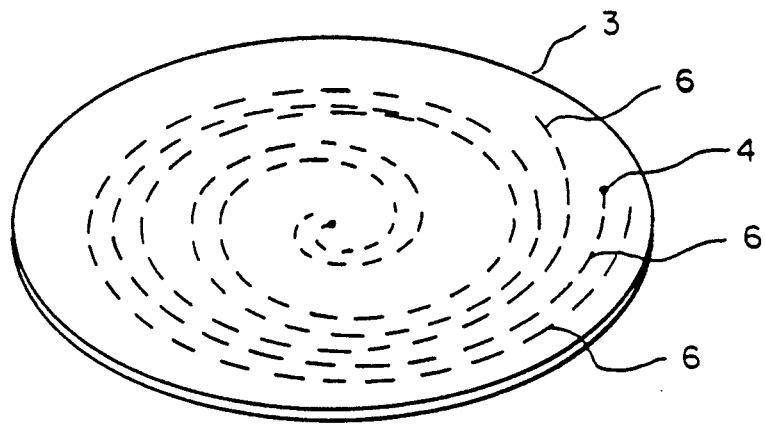
FIG.—4
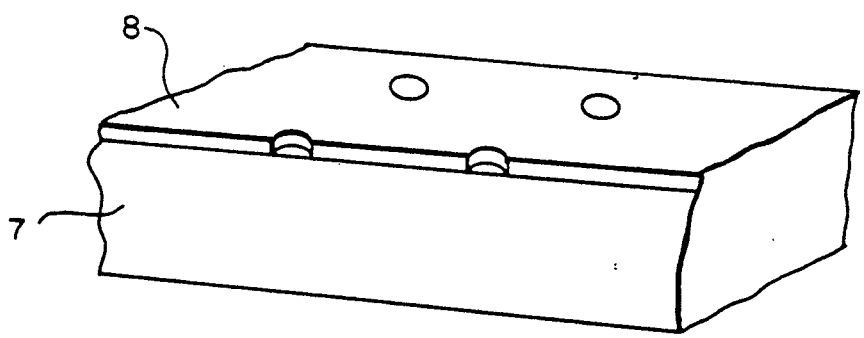
FIG.—5

FIG.—7

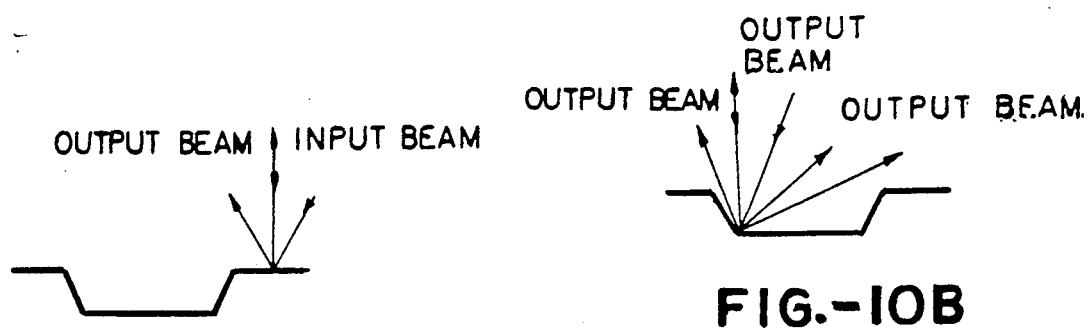
FIG.-10A
FIG.-10B
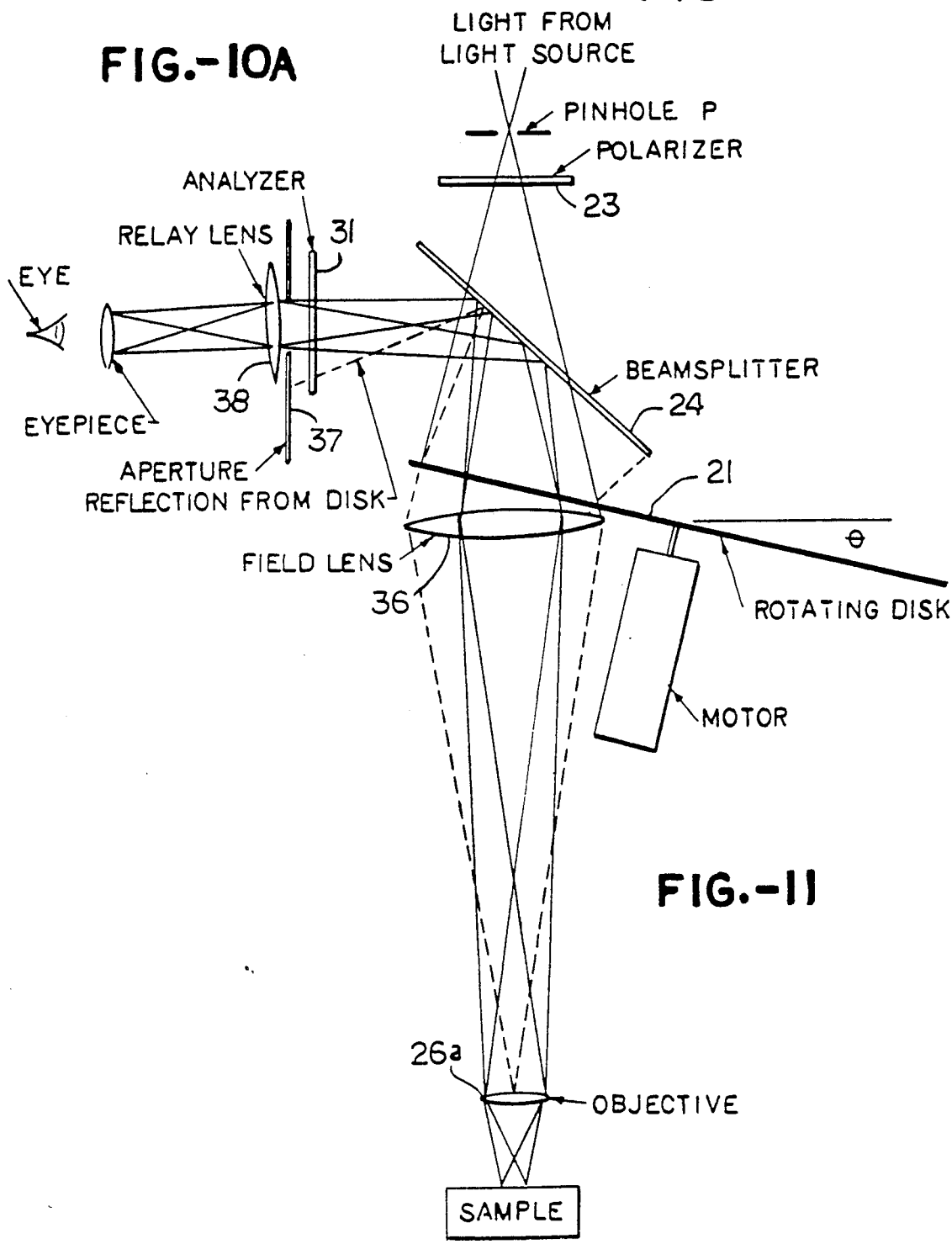
FIG.-11

SCANNING CONFOCAL OPTICAL MICROSCOPE

This is a division of application Ser. No. 226,044, filed on July 29, 1988, now U.S. Pat. No. 4,927,254 which, is a continuation-in-part of copending application Ser. No. 031,516 Filed Mar. 27, 1987 and now abandoned.

FIELD OF THE INVENTION

This invention relates generally to confocal optical microscopes and more particularly to a scanning confocal optical microscope.

BACKGROUND OF THE INVENTION

Conventional confocal optical microscopes are known for their extremely short depth of focus and improved transverse resolution. The main drawback with conventional confocal scanning optical microscopes is that they illuminate only one point on the object at a time. To scan the object either the sample or beam must be mechanically moved to form a raster image of the object. Mechanical scanning is time consuming.

In a paper appearing in The Journal of the Optical Society of America, Vol.58, No.5, May 1968, there is described a tandem-scanning reflected-light microscope. In the described microscope both the object plane and the image plane are scanned in tandem so that only light reflected from the object plane is included in the image. The object to be viewed is illuminated with light passing through a plurality of holes in a rotating disc which are focused onto the object by an objective lens. Thus, a large number of points on the object, corresponding to the holes which are illuminated, are illuminated at one time. The holes themselves are located along spiral paths. By rotating the disc raster scan of the object is obtained. Reflected light from the illuminated spots is directed to the opposite side of the same apertured disc and passes through optically congruent holes on diametrically opposite sides of the rotating disc. The image obtained had better contrast and sharpness than possible with the usual reflected-light microscope. This is due to the fact that reflected light from within the microscope and other stray light coming from other points is intercepted by the opaque portions of the disc and the image only comprised reflection from the illuminated spots. The system of the prior art is extremely complex and difficult to align because of the necessity of assuring that the light reflected from the illuminated spots must pass through congruent holes on the opposite side of the rotating disc. Therefore, despite its obvious advantages, only two or three microscopes of this type have been constructed in the last 20 years.

The present invention employs the principals of a confocal optical microscope such as illustrated schematically in FIG. 1. Light input from a laser, arc lamp or other light source impinges upon a plate 11 which includes a pinhole 12. The light travels through the pinhole to the objective lens 13 and is focused on the object plane 14. Light reflected from the object plane travels back through the pinhole as shown and can be viewed. Reflection from out of focus planes such as plane 16 does not converge at the pinhole and is therefore blocked by the plate 11. In operation the reflected light passing through the pinhole impinges upon an associated detector The detector output is maximum when the object is located at the focus of the lens, otherwise the light received at the pinhole is defocused and the amplitude of the signal falls off rapidly as the position of the object is changed on either side of the object plane. The system has a very short depth of focus in addition to excellent transverse definition.

As previously described, such a microscope can be mechanically scanned to form a raster image by moving the object or pinhole in a raster pattern.

OBJECTS AND SUMMARY OF THE INVENTION

It is a general object of the present invention to provide a scanning confocal microscope which overcomes the mechanical alignment problems of the prior art Tandem Scanning Microscope and which presents a total image of the object without the necessity of mechanical scanning of the light beam or object.

It is another object of the present invention to provide confocal microscope employing a rotating apertured scanning disc in which reflections from the disc and other stray light is eliminated from the image making it possible to observe weakly reflecting objects.

In accordance with the invention there is provided a scanning microscope for viewing an object which comprises scanning disc with a plurality of holes arranged in a predetermined pattern and a light source for illuminating a portion of said disc. A polarizer receives the light from the source and polarizes the light prior to the light illuminating the disc. An objective lens focuses light diffracted through said plurality of illuminated holes onto an objective lens which focuses a plurality of spots on the object. The objective lens receives light reflected from the object spots and focuses the light on the corresponding pin hole. A quarter wave plate is interposed between the objective lens and the disc.

A beam splitter receives the reflected light traveling through the holes and directs the light to a polarizer. Means are provided for rotating the disc to scan the spots across the object in a raster scan to provide an image of the region of the object illuminated by the spots.

In other embodiments the disc is tilted to deflect reflections from the rotating disc so that they do not impinge on the image of the object.

BRIEF DESCRIPTION OF THE DRAWING

The foregoing and other objects of the invention will be more clearly understood from the following description taken in connection with the drawings of which:

FIG. 4 is a perspective view of a Nipkow disc used in the present invention.

FIG. 5 is an enlarged view of a section of the disc of FIG. 1 showing its construction.

FIGS. 10a and 10b illustrate how the dark field imaging.

FIGS. 10a and 10b illustrate how the dark field stop of FIG. 9 operates.

FIG. 11 shows another embodiment of the present invention.

DESCRIPTION OF THE PREFERRED EMBODIMENT(S)

Figure 1:
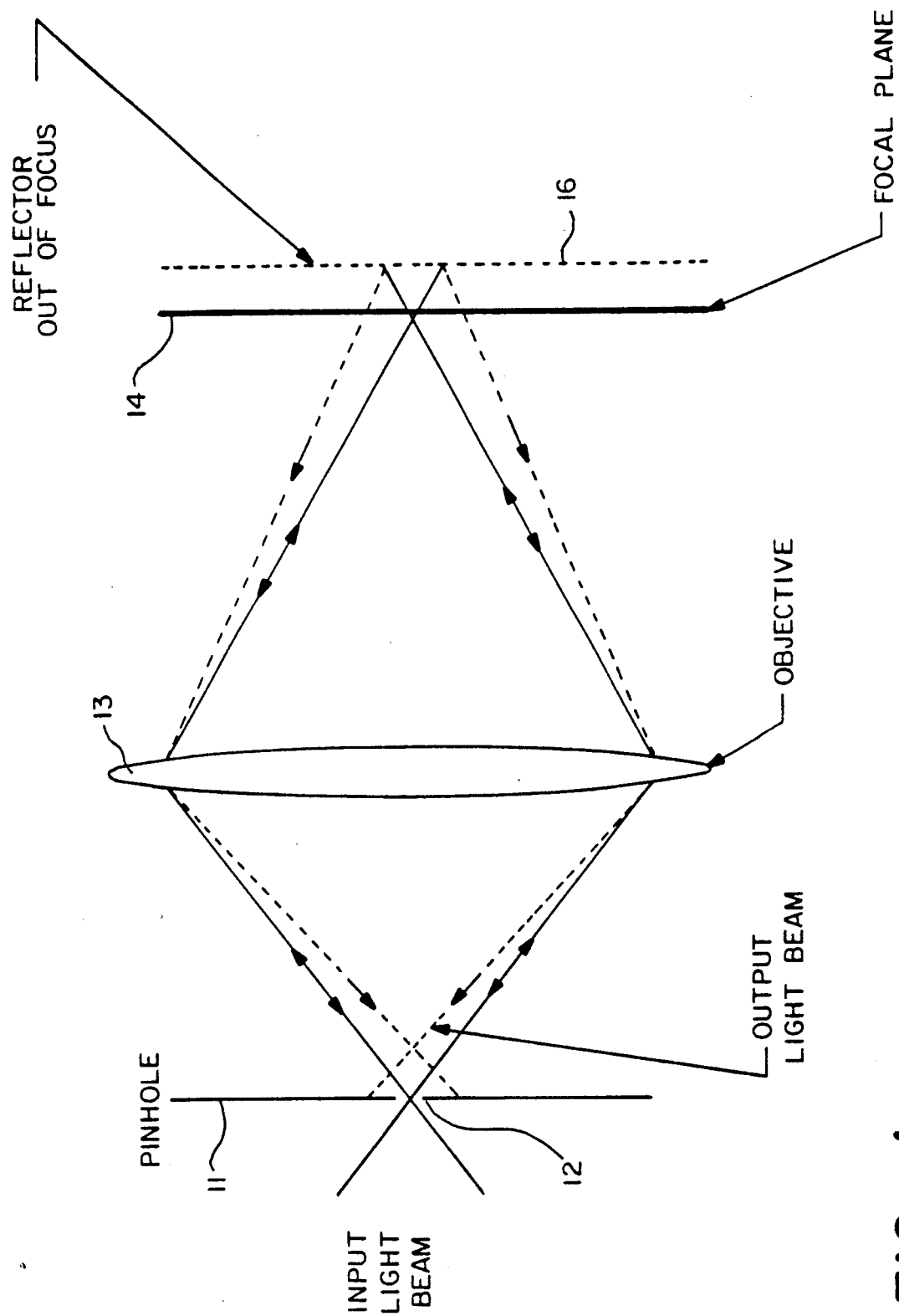
FIG. 1 shows a prior art confocal optical microscope.
Figure 2:
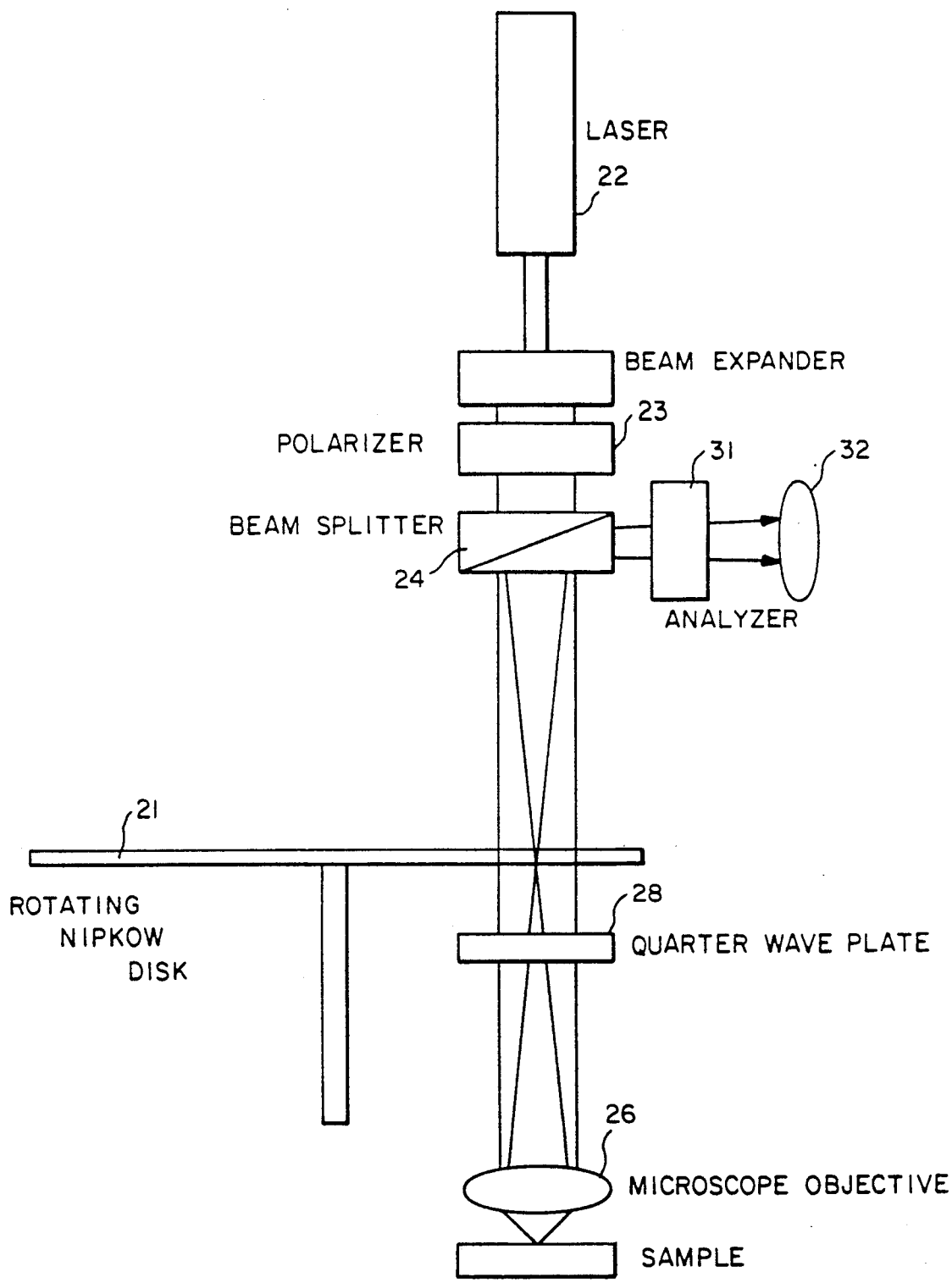
FIG. 2 shows a scanning confocal optical microscope in accordance with the present invention.

Referring to FIG. 2, the microscope includes a circular disc 21, known as a Nipkow disc 3 which has holes 4 disposed in a pattern of several interleaved spirals 6 of several turns each. The holes are spaced approximately ten hole diameters apart. In one example the average radius of the spiral was five centimeters and the spiral extended over a radial distance of 1.8 centimeters with a total of 200,000 holes of 20 micrometer diameter formed in the periphery of the disc. Preferably the disc is of transparent material 7 with a layer 8 of black emulsion or black chrome in which the holes 4 are formed by photo masking techniques.

A suitable light source, for example, either a mercury arc lamp or a laser 22, is used to illuminate an area of 1.8 centimeters by 18 centimeters containing about 4,000 holes. The light from the light source is polarized by a polarizer 23 and passes through a beam splitter 24 before striking the disc 21. The holes diffract the impinging light and the incident beam converges an objective lens 26. For example, the incident beam converges to a five millimeter diameter on the back of the objective lens 26 so that 4,000 points on the object 27 are simultaneously illuminated. Because of the spacing of the image points there is negligible interference between the different illuminated points.

The disc is rotated, for instance, 2,00 rpm and since the holes are arranged along the spiral path the rotation of the disc forms a raster scan across the object, thus forming 7,000 lines 500 frames per second.

The light focused on the object is reflected and focused at the same pinholes by the objective lens after traveling through a quarter wave plate 28. The light passing through the holes strikes a beam splitter 29 and is directed at right angles there from to an analyzer 31 and thence can be viewed by the naked eye through a transfer lens 32 which focuses on the pinholes.

Figure 3:
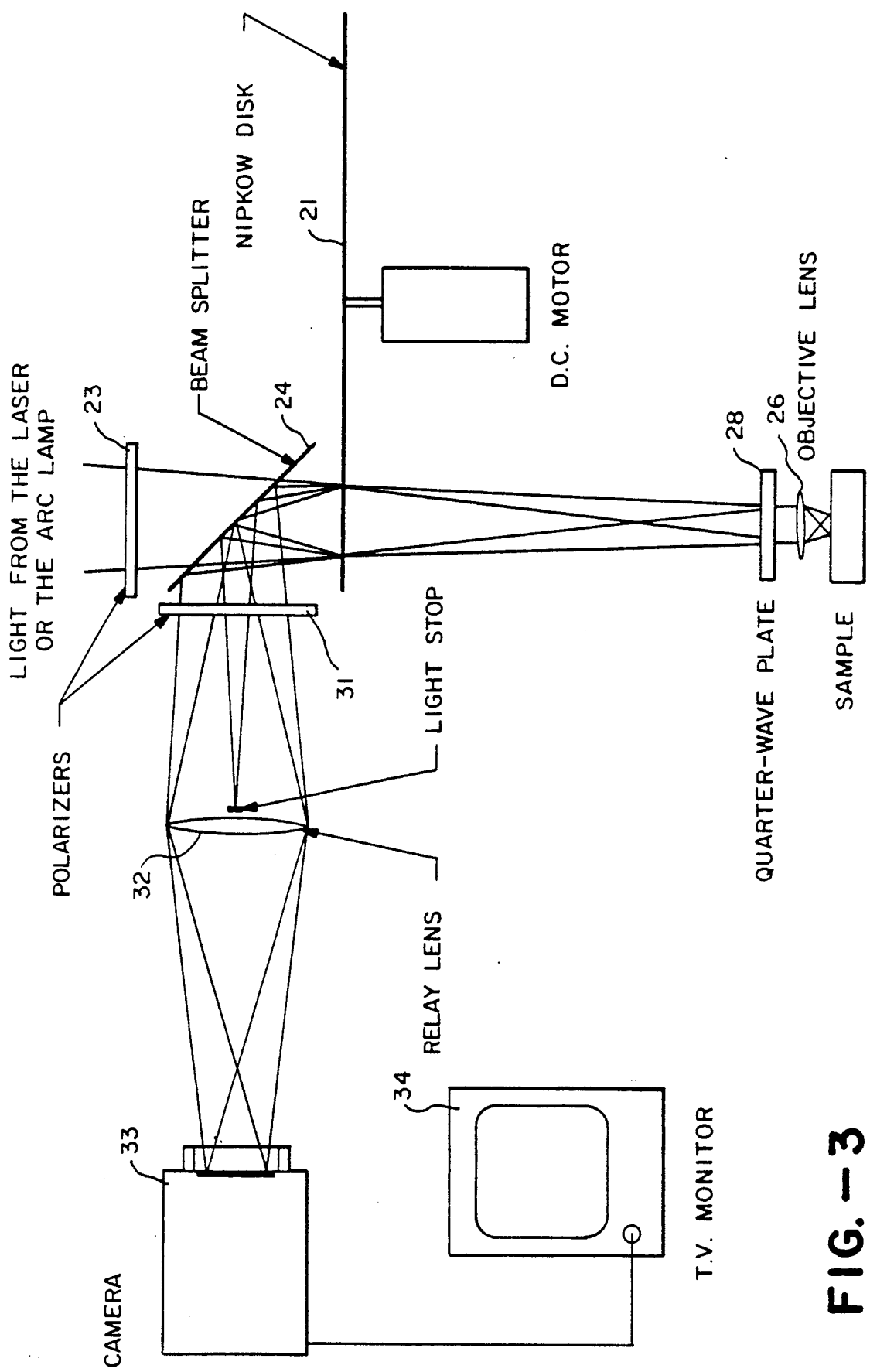
FIG. 3 shows another embodiment of the scanning confocal microscope in accordance with the invention.

In the embodiment of FIG. 3, where like reference numerals are applied to like parts, the image travels through a relay lens to a camera 33 and to a TV monitor 34 which provides a display. Alternately the camera may be a photographic camera which takes a picture of the object. It is to be noted that no precise alignment is needed. The same holes are used for transmission and reception of the light making it relatively simple to align the microscope. The eyepiece, or camera, is focused on the pinholes illuminated by reflected light from behind the pinholes. Centering of the spiral is not critical. Vibration is not a severe problem provided that disc vibration has an amplitude much less than the depth of focus of the lenses at the pinholes, typically a distance greater than 1 millimeter.

The use of the polarizers and a quarterwave plate reduces interference from reflections from the disc as well as the surfaces of the microscope elements by a factor of the order of $10^{-6}$ intensity and provide a clear visual image.

With reference to FIG. 3 the apparatus also includes a light stop which is located at the focal point of the incident light reflected from the surface of the Nipkow disc.

The purpose of this stop is to completely remove all remaining reflected light from the disc. When a laser source is employed, the stop is placed at the focus of the reflected converging beam. With a lamp source, an image of the source is focused on the stop. With an incoherent light source of finite diameter, the stop must be larger than it would need to be with a coherent light source. Nevertheless the stop would only intercept a very small fraction of the area of the beam passing through the pinholes to the observer. The microscope can be constructed with solely a light stop, and this may be advantageous when an object having a low reflectivity is being viewed.

The object or the objective lens can be moved up or down in order to focus on various planes in a translucent object such as a biological material like bone, or at various levels of sample such as an integrated circuit. A very similar system can be used as a range sensor in robotic applications.

The Nipkow disc is illuminated by a collimated laser beam with, perhaps, as much several watts in the beam. The pinholes in the disc are viewed as described in FIG. 3. Images of the pinhole are focused on a distant plane by a camera lens. The beam, after leaving the pinhole, may be expanded by a telescope to give a larger beam at the lens pupil. This is to make it possible to use a lens of larger aperture so as to obtain the optimum transverse and range definitions.

When the Nipkow disc is rotated a region at the focal plane of the lens is imaged. Thus a direct real time image of a plane at a fixed distance from the lens is obtained in real time. Images of other cross sections are easily obtained by moving the lens back and forth. This can be used to control a robot.

In the embodiments to be described, the rotating disc is tilted to eliminate reflections from the rotating disc making it possible to observe weakly-reflecting objects.

Figure 6:
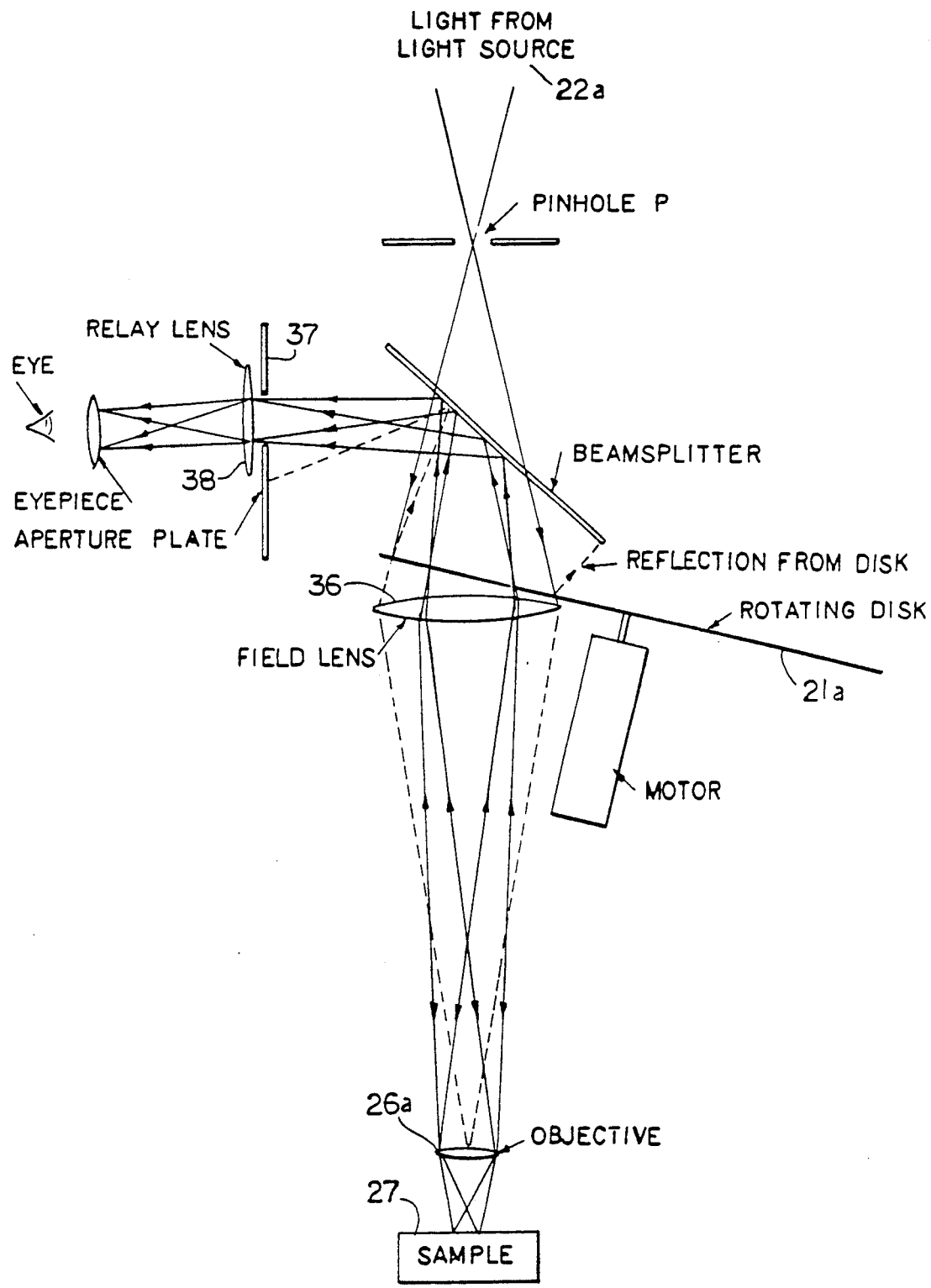
FIG. 6 shows an embodiment of the invention with tilted disc.

Referring to FIG. 6, light from a light source 22a, such as a mercury arc lamp, a filament lamp or a laser, is focused onto a pinhole P whose diameter is made small enough to get fairly good point source consistent with providing sufficient illumination of the sample. The diameter of the pinhole is typically in the range from 100μm to 1mm. The light emerging from the pinhole passes through a beamsplitter 24 and through the pinholes in the rotating disc 21a. It then proceeds through a field lens 36 and through the objective lens 26a and strikes the sample. In FIG. 6, the dashed lines indicate the ray paths if the disc were not present, similar to a standard microscope; without the disc, the pinhole would be imaged into the center of the objective lens. When the rotating disc is present, the light passes through the pinholes in the disc. The light from an individual pinhole in the disc is diffracted into an Airy pattern at the pupil of the objective lens. The center of this Airy pattern is always located at the center of the objective lens, due to the focusing of the image of the pinhole P by the field lens onto the objective, as already described. thus, the shape and intensity of the illumination at the objective lens does not vary very much from one pinhole to another. Therefore, the definition and the intensity of the illumination of the sample is approximately uniform over the field of view.

The spacing of the rotating disc from the objective is typically of the order of 200mm and the diameter of the pinhole is chosen so that the illumination of the objective by one pinhole in the disc is fairly uniform. This implies that the pinhole diameter should be small enough so that the pupil of the objective lens is smaller than the diameter of the zeroth orderlobe of the pinhole at the pupil. In turn, this implies that light passing through the pinhole, reflected from the sample through the objective lens, is focused to a spot at the pinhole which is larger than the diameter of the pinhole. Typically, this spot also has the form of an Airy pattern. Thus, this pinhole also acts like a spatial filter to the reflected light. If d is the distance from the objective to the rotating disc, a is the radius of the pinhole, and b is the radius of the pupil of the objective lens, then, without the field lens present, the ratio of the amplitude of the field at the edge of the pinhole to that at its center is $J_1(2\pi ab/h\lambda)/(2\pi ab/\lambda h)$ where $\lambda$ is the wavelength and $J_1$ is a first order Bessel function. For best definition, the pinhole should be infinitesimal in diameter. However, to pass enough light through the pinhole, the pinhole size must be finite, and for optimum performance, $ab/h\lambda < 0.61$ and preferably $ab/h\lambda$ is of the order of 0.25.

With the spacings used, this implies that the pinhole diameter is typically in the range of 10-20$\mu$m. When the pinhole diameter is infinitesimal, the beam passing through the pinhole is diffracted into a $2\pi$ solid angle. In this case, the objective lens is illuminated uniformly by the diffracted beam from the pinhole. As the pinhole diameter is made larger, the diffraction angle of the beam passing through the pinhole becomes smaller and the objective lens is nonuniformly illuminated. With too large a pinhole diameter, the intensity of illumination at the pupil of the objective lens is largest at its center, falls off towards its edges, and includes higher order sidelobes so that the effective aperture of the objective lens is reduced from its value with uniform illumination. Therefore, the definition of the microscope image is deteriorated when the pinhole size is too large. A further major disadvantage of using too large a pinhole is that the variation of the intensity of the output, when there is a plane reflecting sample present, is not as rapid with distance from the focus as it is with an infinitesimal pinhole. Put another way, if the pinhole diameter is made too large, then the short depth-of-focus dictated by the principle of the confocal microscope is no longer obtained and the device behaves more like a standard microscope.

It should be noted that it is not advisable to make the pinhole diameter too small, for then not enough light passes through the pinhole. In order to eliminate interactions between the light passing through individual pinholes, particularly when using a laser source, it is necessary to have the pinhole spacing on the disc of the order of ten pinhole diameters apart. Thus, less than one percent of the light reaching the disc passes through the pinholes. Therefore, it is vitally necessary to eliminate the reflected light from the disc itself.

One technique for doing this was described above with reference to FIGS. 2 and 3. A preferred technique is shown in FIG. 6. The disc is tilted sufficiently far so that the light reflected from the disc hits an aperture plate 37 in front of the relay lens 38 and is eliminated. This is schematically illustrated by the dotted area showing the reflections from the disc. The plane of this aperture plate is placed at the mirror image position of the plane of the pinhole P and the beamsplitter. The image of a pinhole on the disc is focused on the eyepiece 39, which in turn implies than an image of the sample can be seen at the eyepiece. The tilt angle of the disc $\theta$ can be compensated by tilting the sample by an angle $\theta/M$, where M is the magnification of the objective lens 26a.

In the embodiment of Girue 7, polarizer 23, analyzer 31, and $\lambda/4$ plate 28 as in the embodiments of FIGS. 2 and 3 are added. Light from the light source is polarized, and when reflected from the disc and the beamsplitter, passes through an analyzer rotated at 90 degrees to eliminate the polarized light reflected from the disc. The polarization of the beam passing through the objective lens through the $\lambda/4$ plate and reflected back through it again is rotated by 90 degrees, and hence passes through the analyzer. Hence, the image of the sample can be observed, but the light from the disc is eliminated by two strategems, tilt and polarization.

Figure 8:
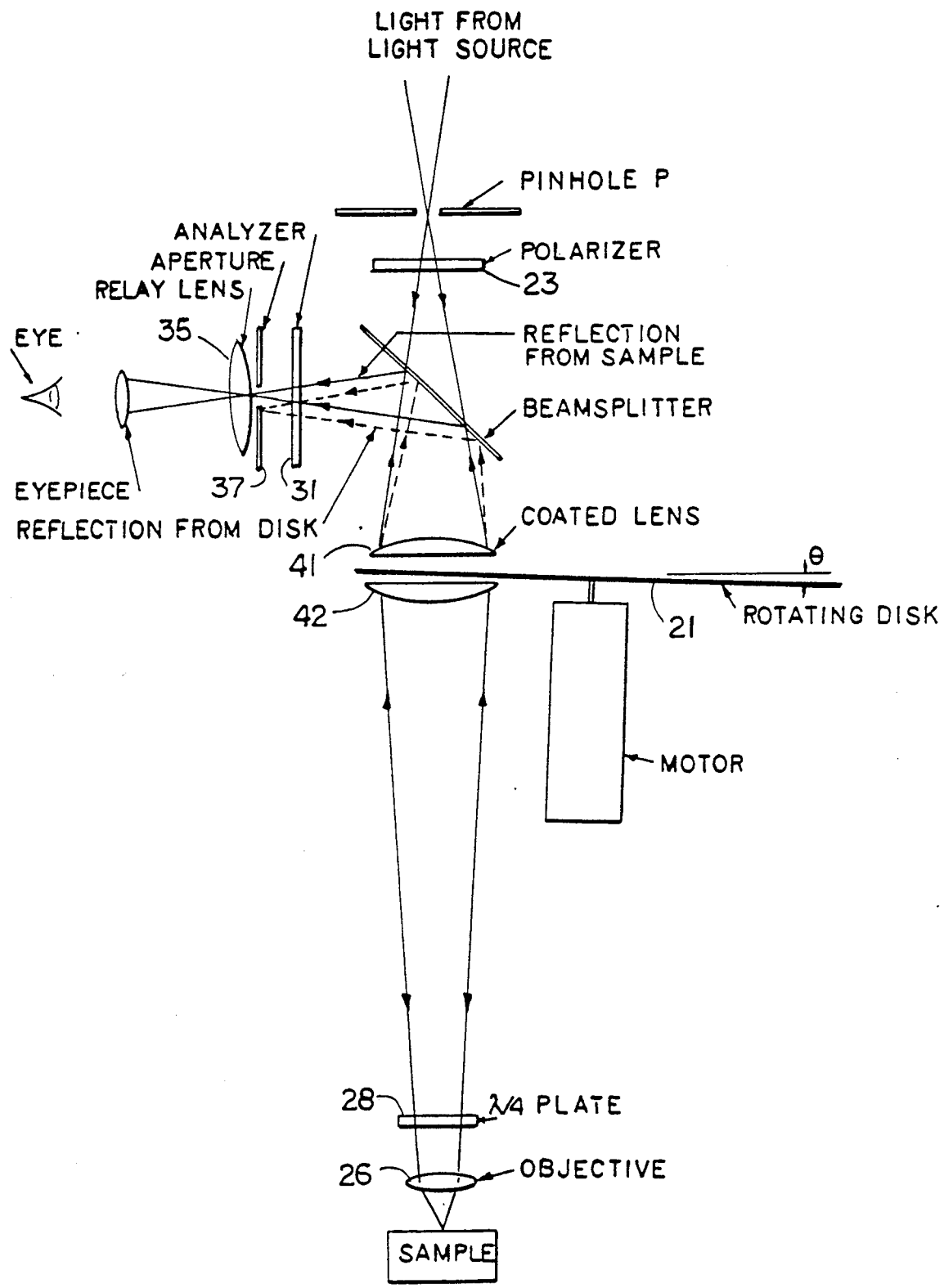
FIG. 8 shows an embodiment similar to that of FIG. 7 with a split field lens.

A further improvement on this system is to split the field lens into two parts, 41 and 42, one between the disc 21 and the sample and the other on the top side of the disc 21, as shown in FIG. 8. The upper lens 41 collimates the beam from the pinhole P to produce a parallel beam at the disc. Without the disc present, the lower lens focuses the collimated beam to a point on the pupil plane of the objective lens. The beam reflected from the disc is now focused by the upper field lens 41 to a point on the aperture 37 in front of the relay lens 38. This aperture is placed in a plane which is the mirror image in the beam splitter of the plane of the pinhole P. The reflected light passing through the pinhole of radius a is diffracted so that the first zero of the Airy pattern of the diffracted beam from the pinhole is of radius $R=0.61 \lambda L/a$, where L is the distance of the pinhole P from the upper field lens. Typically L is 75mm, a=10 micrometers and R=2.5mm. with $\lambda=0.54$mm. This implies that the focused spot corresponding to the reflection from the disc should be placed a distance slightly greater than R from the center of the aperture pinhole. Thus the tilt angle of the disc need only be of the order of $\theta = R/2L$ or 1 degree.

This makes it still easier to eliminate the reflected light, in particular to eliminate any stray light due to diffraction of the light beam and the granularity of the film on the rotating disc. By this means, it is only necessary to tilt the rotating disc by one or two degrees instead of the order of five degrees, as in FIGS. 6 and 7, since the diameter of the beam that must be eliminated at the aperture in front of the relay lens is relatively small. This has the further advantage that with a small tilt, the depth of focus is much larger than the change in height of the disc from one side of the beam to the other.

Figure 7:
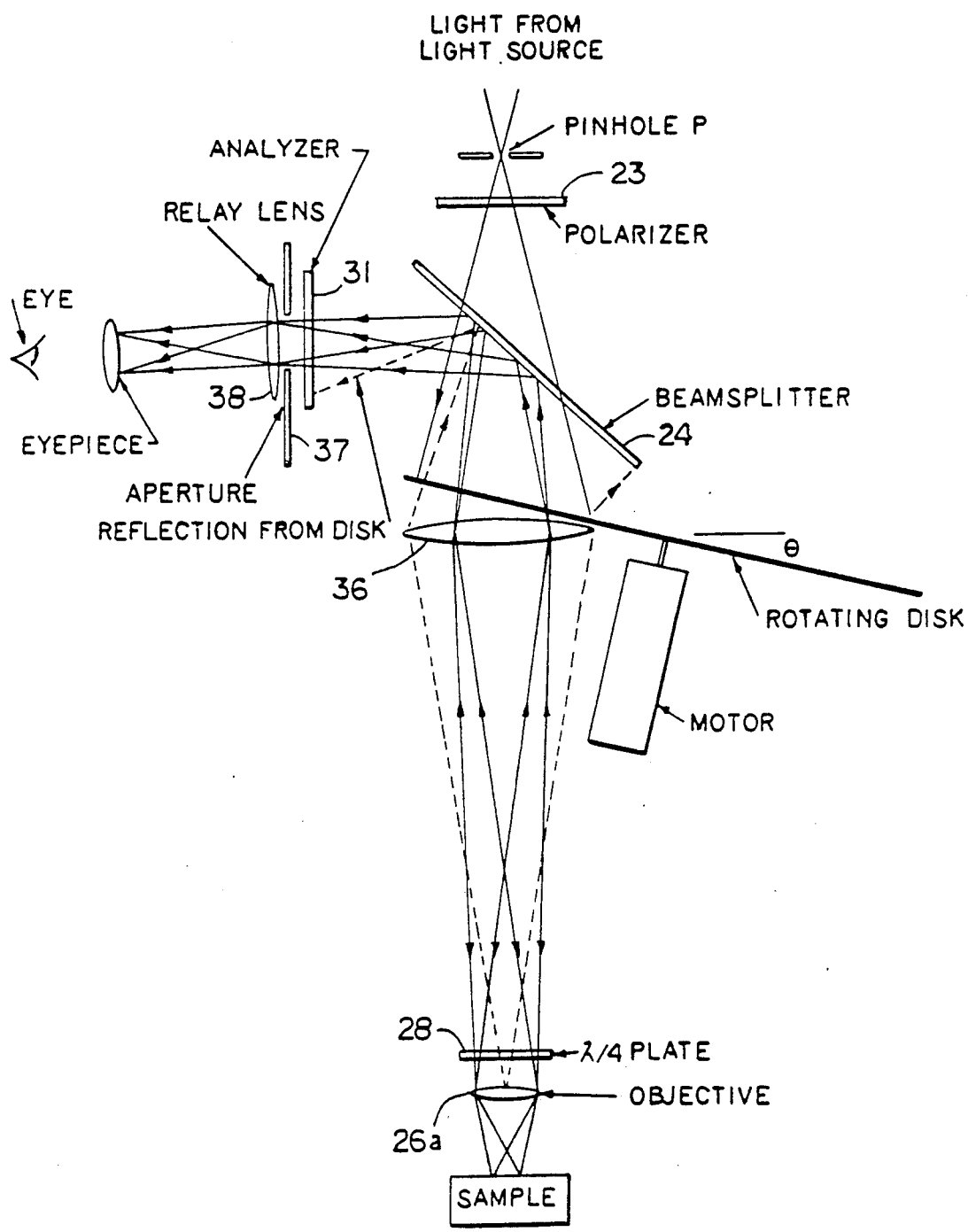
FIG. 7 shows an embodiment similar to that of FIG. 6 with analyzer, polarizer and quarterwave plate.

In the embodiments shown in FIGS. 6 and 7, the quality of the image tends to deteriorate at the edges of the field because of the large tilt of the rotating disc that is required. The polarizer and analyzer, along with the $\lambda/4$ plate, are still used to improve the signal-to-noise ratio of the wanted signal to the reflected light from the disc still further. With this system, reflected light from the disc is below the level of all other sources of light in the defocused beam. For example, when the beam is badly defocused as the sample is moved out of the focal plane of the objective lens, it might be expected that approximately one percent of the reflected light from the sample would still pass through pinholes (their total area being assumed to be 1% of the illuminated area of the disc), and would give rise to background light, which is difficult to eliminate. This phenomenon dictates the lower level of the dynamic range of the system.

Figure 9:
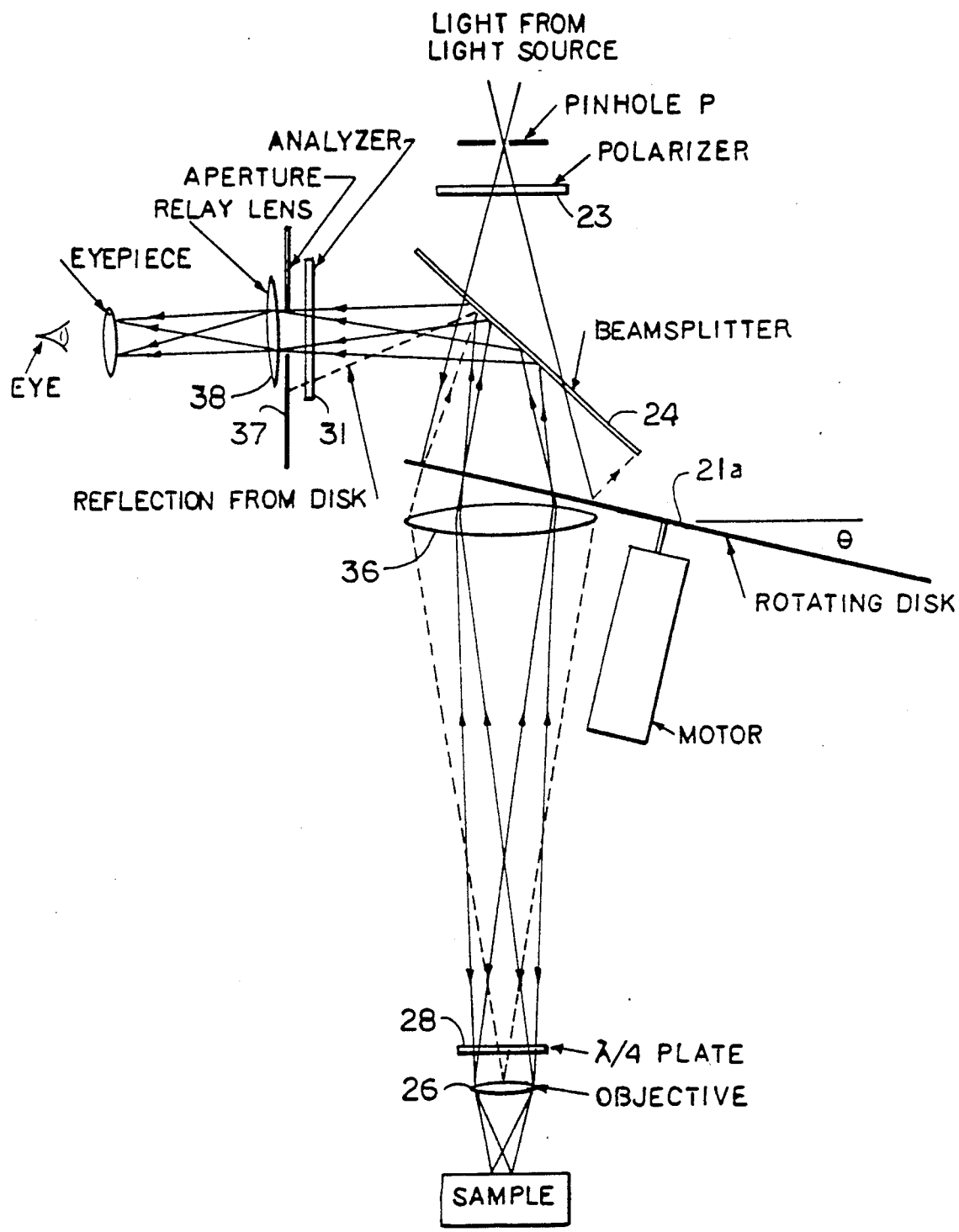
FIG. 9 shows an embodiment of the invention with dark field imaging.

Another embodiment of this microscope which is useful for certain purposes is that of dark field imaging. In FIG. 9 a stop is placed over half of the back of the objective. The presence of this stop eliminates light directly reflected from specular reflector. For example, as shown in FIG. 10a, a ray A impinging on the objective lens of sample returns along a path like ray B. However, with the stop in place, no light returns along path B and hence specular reflector cannot, in principle, be seen. However, light from a corner or a sharp edge scatters in all directions and some will go through the lens to regions where the stop is not present, as shown in FIG. 10b. Therefore, the system forms a dark field imaging system with the short depth-of-focus of the real-time scanning optical microscope. Such a system is particulary good for looking at holes in photoresist and other materials where the beam can enter through the region of the hole and not through the photoresist itself. In this case there is no aberration of the beam by the photoresist and the light reflected from the top and bottom corners of the hole makes it possible to make measurements of the depth and slope of the hole. In general, dark field imaging can be obtained if the shape of the stop is chosen so as to eliminate light directly reflected from a specular reflector.

A problem, and sometimes an advantage, of this type of microscope is the chromatic aberration of the objective lens. The depth-of-focus of this microscope can be of the order of 0.5 micrometers or less with a 0.9 aperture lens. When a white light source is used, however, different colors tend to be focused at different depths due to the chromatic aberration of the lens and the chromatic aberration in the focal plane can be as much as several micrometers with a white light source. This has the advantage that the microscope can be useful for inspection because different depths appear in different colors. On the other hand, for quantitative measurements, it is better to observe a beam focused on a given surface by determining when the intensity is maximum. This is best done by placing an optical filter in front of the pinhole or in front of the relay lens so that a relatively narrow band of light reaches the eye or the TV camera.

A further version of this microscope is suitable for polarization imaging. In this case, shown in FIG. 11, the polarizer 23 and analyzer 31 are used with the analyzer rotated so that its plane of polarization is at 90 degrees to the polarizer. However, the λ/4 plate shown in FIGS. 2, 3, 7, and 9 is omitted. Therefore, a field image is obtained from a reflector which does not rotate the plane or polarization. Edges and dielectric materials rotate the plane or polarization of the beam upon reflection and therefore show up in polarization image. The system is also useful for observing reflections from magnetic materials such as a magnetic disc of the type used for computer storage. It is also apparent that the system will have the same depth-of-field as the standard confocal microscope.

Figure 12:
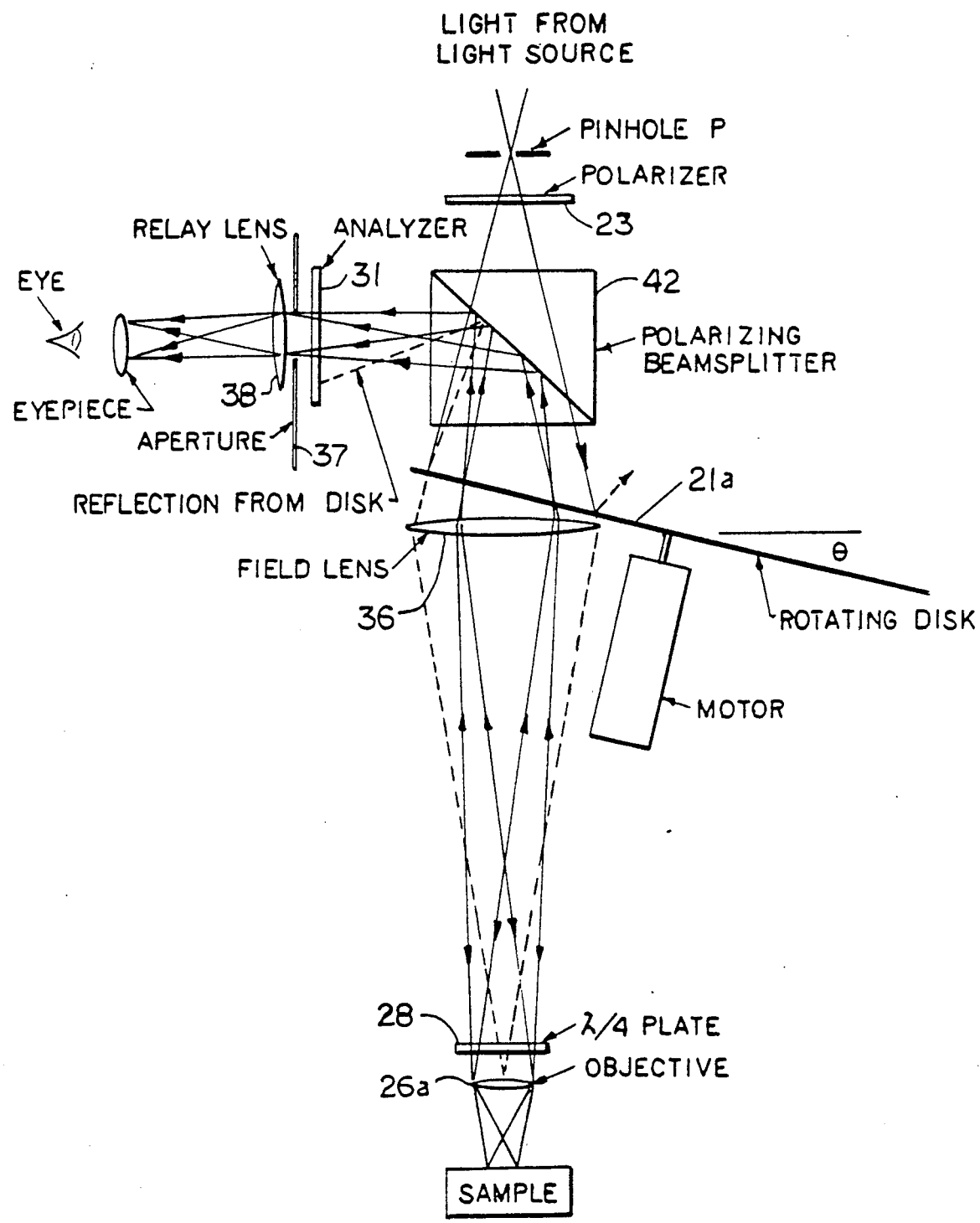
FIG. 12 shows an embodiment of the invention using a polarizing beam splitter.

Another embodiment of the microscope which can provide the advantage of less light loss than with the use of a plate beamsplitter, is to employ a polarizing beamsplitter, as illustrated in FIG. 12. Light from a laser source, mercury arc lamp or filament lamp is first linearly polarized by the polarizing beamsplitter 42 then passes through the apertures, field lens 36 and quarterwave plate 28 to the objective lens 26. The light returning from the object has it polarization rotated by 90 degrees after passing back through the quarterwave plate and therefore is reflected by the beamsplitter 42 to the relay lens and then to the eyepiece, while the light reflected from the disc passes back to the illuminator, since its plane of polarization has not been rotated. In order to further suppress the background reflection from the disc and from the surfaces of the beamsplitter, a polarizer 23 and an analyzer 31 is used in this embodiment. The advantage of the beamsplitter is that very little light is lost in passing through it. In a normal beamsplitter, half the power is wasted on each transit through it. Furthermore, the polarizing beamsplitter also acts as a polarizer and an analyzer itself, so the overall background reflections can be lower compared to the other embodiments.

We claim:

1. A scanning microscope for viewing an object comprising a scanning disc with a plurality of pinholes arranged in a predetermined pattern;

a light source on one side of said disc for illuminating an area of said disc;

a first polarizer for polarizing the light which illuminates the disc;

an objective lens on the opposite side of said disc for focusing light diffracted by said pinholes onto the object to illuminate a plurality of points on said object;

means for mounting said disc with its rotational axis at an angle with respect to the axis of light from said source to said objective lens;

means for rotating said disc to scan the points across the object;

said objective lens serving to receive light reflected from the object and focus the light on corresponding pinholes;

a quarterwave plate disposed to cooperate with said objective lens to intercept the light traveling to and reflected from said object;

a beam splitter on said one side of said disc between said first polarizer and said disc for receiving reflected light traveling through said quarterwave plate and said pinholes and directing it; and a polarizer for receiving the directed light.

* * * * *

UNITED STATES PATENT AND TRADEMARK OFFICE
CERTIFICATE OF CORRECTION

PATENT NO. : 5,022,743

DATED : June 11, 1991

INVENTOR(S) : Gordon S. Kino, et al.

It is certified that error appears in the above-identified patent and that said Letters Patent is hereby corrected as shown below:

At column 1, line 3 insert --This invention was made with Government support under Contract No. N00014-84-K-0327 awarded by the Department of the Navy. The Government has certain rights in this invention.--

Signed and Sealed this

Eleventh Day of April, 1995

*Attest:*

BRUCE LEHMAN

*Attesting Officer*   *Commissioner of Patents and Trademarks*